(12) United States Patent
Haggerty et al.

(10) Patent No.: US 8,457,825 B2
(45) Date of Patent: Jun. 4, 2013

(54) METHOD AND APPARATUS FOR OPERATING A POWERTRAIN SYSTEM IN RESPONSE TO ACCESSORY LOAD

(75) Inventors: Michael D Haggerty, Sterling Heights, MI (US); Sean W McGrogan, Ann Arbor, MI (US); Adam J Heisel, Garden City, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 204 days.

(21) Appl. No.: 13/151,373

(22) Filed: Jun. 2, 2011

(65) Prior Publication Data

US 2012/0306457 A1 Dec. 6, 2012

(51) Int. Cl.
*B60L 9/00* (2006.01)
(52) U.S. Cl.
USPC .......... 701/22; 701/54; 701/84; 701/90; 701/101; 701/51; 701/70; 701/79; 701/110; 180/65.1; 180/65.28; 180/69.3; 180/337; 318/139; 477/7; 477/17; 477/37; 477/65; 903/903; 903/904; 903/905; 903/906; 903/914
(58) Field of Classification Search
USPC .......... 701/22, 54, 84, 90, 101, 51, 70, 79, 701/110; 180/65.1, 65.28, 69.3, 337; 318/139; 903/903, 904, 905, 906, 914
See application file for complete search history.

(56) References Cited

U.S. PATENT DOCUMENTS

| 5,978,719 | A | * | 11/1999 | Yano et al. ...................... 701/22 |
| 6,345,216 | B1 | * | 2/2002 | Morimoto et al. ............... 701/22 |
| 6,904,881 | B2 | * | 6/2005 | Hirowatari et al. ......... 123/90.15 |
| 2005/0051122 | A1 | * | 3/2005 | Hirowatari et al. ......... 123/90.17 |
| 2006/0231792 | A1 | * | 10/2006 | Drzal et al. ............... 252/188.28 |
| 2007/0227791 | A1 | * | 10/2007 | Ueno ........................... 180/65.2 |
| 2009/0320811 | A1 | * | 12/2009 | Gates et al. .............. 123/568.29 |
| 2012/0306457 | A1 | * | 12/2012 | Haggerty et al. ............... 322/29 |

OTHER PUBLICATIONS

U.S. Appl. No. 13/029,381, Michael Arnett.
U.S. Appl. No. 13/151,327, Ganley.
U.S. Appl. No. 13/152,380, Arnett.
U.S. Appl. No. 13/151,373, Haggerty.
U.S. Appl. No. 13/152,328, Whitney.
U.S. Appl. No. 13/170,428, Wang.

* cited by examiner

Primary Examiner — Redhwan K Mawari

(57) ABSTRACT

A powertrain system includes an electric machine mechanically coupled to an internal combustion engine mechanically coupled to a transmission. A method for operating the powertrain system includes determining an engine stall threshold rate during engine operation in a low load condition. A time-rate change in an accessory load is controlled by the electric machine operating in an electric power generating mode in response to the engine stall threshold rate during the engine operation in the low load condition.

10 Claims, 2 Drawing Sheets

METHOD AND APPARATUS FOR OPERATING A POWERTRAIN SYSTEM IN RESPONSE TO ACCESSORY LOAD

TECHNICAL FIELD

This disclosure is related to powertrain systems employing electric machines to generate torque.

BACKGROUND

The statements in this section merely provide background information related to the present disclosure. Accordingly, such statements are not intended to constitute an admission of prior art.

Known vehicle powertrain systems include one or more torque actuators coupled to transmissions that transfer torque to a driveline for tractive effort. Known torque actuators include internal combustion engines and electric motor/generators. Known powertrain systems employing electric motor/generators may have high-voltage and low-voltage electrical systems. Known electrical systems transform high-voltage electric power generated by an electric motor/generator to low-voltage DC electric power using an inverter and auxiliary DC/DC power module. Elements of high-voltage electrical systems may be disabled under specific circumstances.

Known electrical systems operate in low-voltage electric power generating modes using control strategies that include operating auxiliary DC/DC power modules at constant electric power output at a fixed voltage setpoint. Low-voltage electric power generating modes may include operating the engine at idle speeds and generating electric power with the low-voltage electrical system to provide low-voltage electric power for operating auxiliary vehicle systems. When engine speed drops below a trigger point, a control system may execute a load shedding scheme to avoid engine stalling. Known load shedding schemes may frequently engage due to engine speed sags associated with vehicle/engine deceleration and associated return to idle operation. Known systems experience rapid engine speed increase subsequent to triggering a load shedding event, which may create a surge in driveline torque.

A known powertrain system employing an electric motor/generator includes a belt-alternator-starter (BAS) system as a torque actuator in place of an alternator. Known BAS systems include a serpentine belt to transfer torque between the engine and the electric motor/generator. Known BAS systems use a high-voltage energy storage system supplying high-voltage electrical power through a voltage inverter to the motor/generator unit. Known BAS systems use a low-voltage electrical system to provide low-voltage electric power for operating auxiliary vehicle systems such as headlamps, interior lights, entertainment systems, power seats, electric windows and HVAC components.

SUMMARY

A powertrain system includes an electric machine mechanically coupled to an internal combustion engine mechanically coupled to a transmission. A method for operating the powertrain system includes determining an engine stall threshold rate during engine operation in a low load condition. A time-rate change in an accessory load is controlled by the electric machine operating in an electric power generating mode in response to the engine stall threshold rate during the engine operation in the low load condition.

BRIEF DESCRIPTION OF THE DRAWINGS

One or more embodiments will now be described, by way of example, with reference to the accompanying drawings, in which.

DETAILED DESCRIPTION

Figure 1:
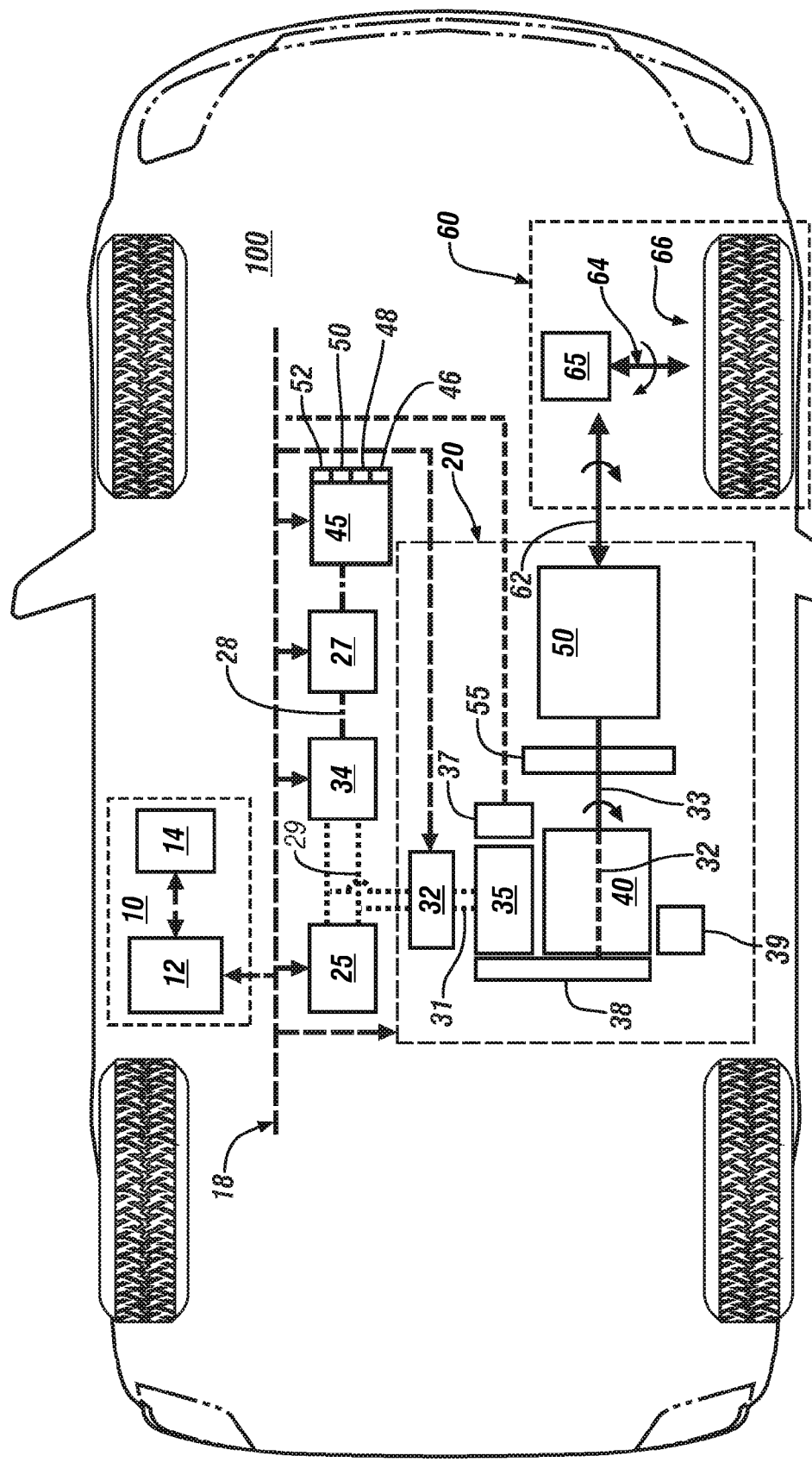
FIG. 1 illustrates a vehicle including a powertrain system including an electric machine mechanically coupled to an internal combustion engine that mechanically couples to a transmission and is controlled by a control system in accordance with the disclosure.

Referring now to the drawings, wherein the showings are for the purpose of illustrating certain exemplary embodiments only and not for the purpose of limiting the same, FIG. 1 schematically shows a vehicle 100 including a powertrain system 20 coupled to a driveline 60 and controlled by a control system 10 that includes control schemes for controlling low-voltage electric power output from an auxiliary power module 34. The powertrain system 20 is illustrative. Like numerals refer to like elements throughout the description.

The illustrative powertrain system 20 includes an electric machine 35 mechanically coupled to an internal combustion engine 40 that mechanically couples to a transmission 50, preferably via a torque converter 55. The electric machine 35 and the internal combustion engine 40 are torque actuators. The electric machine 35 preferably mechanically couples to the engine 40 via a belt-alternator-starter mechanism 38 that mechanically couples to a crankshaft 32 of the internal combustion engine 40 and provides a mechanical power path therebetween. The crankshaft 32 of the internal combustion engine 40 mechanically couples to an output member 33 that mechanically couples to the transmission 50 via the torque converter 55. The transmission 50 includes an output member 62 that couples to the driveline 60. In one embodiment, the belt-alternator-starter mechanism 38 includes a serpentine belt routed between a pulley attached to the crankshaft 32 of the engine 40 and another pulley attached to a rotating shaft coupled to a rotor of the electric machine 35. The aforementioned elements form a belt-alternator-starter (BAS) system. The illustrated powertrain system 20 is an embodiment of a powertrain system on which control schemes may be employed, e.g., control scheme 200 described with reference to FIG. 2.

The engine 40 is preferably a multi-cylinder internal combustion engine that converts fuel to mechanical power through a combustion process. The engine 40 is equipped with a plurality of actuators and sensing devices for monitoring operation and delivering fuel to form a combustion charge to produce torque that is responsive to an operator torque request. The engine 40 preferably includes a low-voltage solenoid-actuated electrical starter 39 for starting in response to a key-crank event. The engine 40 is configured to execute autostart and autostop control schemes and a fuel cutoff (FCO) control scheme during ongoing operation of the vehicle 100. By way of definition, the engine 40 is considered to be in an OFF state when it is not being fueled and is not spinning. The engine 40 is considered to be in an FCO state when it is spinning but is not being fueled. As is appreciated, an autostart event is executed subsequent to executing an autostop event to start or restart engine operation during ongoing powertrain operation. The engine 40 may be started to transfer tractive torque to the driveline 60 and/or to provide power to the electric machine 35 to generate electric energy that may be stored in a high-voltage battery 25 and a low-voltage battery 27.

The electric machine 35 is preferably a multi-phase electric motor/generator configured to convert stored electric energy to mechanical power and convert mechanical power to electric energy that may be stored in a high-voltage battery 25. The electric machine 35 includes a rotor and a stator and an accompanying resolver 37. The resolver 37 is a variable reluctance device including a resolver stator and a resolver rotor that are assembled onto the rotor and stator, respectively, of the electric machine 35.

The high-voltage battery 25 electrically connects to an inverter module 32 via a high-voltage DC bus 29 to provide high-voltage DC electric power in response to control signals originating in the control module 12. The inverter 32 electrically connects to the electric machine 35 via a multi-phase power bus 31. The inverter 32 is configured with suitable control circuits including power transistors for transforming high-voltage DC electric power to high-voltage AC electric power and transforming high-voltage AC electric power to high-voltage DC electric power. The inverter 32 preferably employs pulsewidth-modulating control to convert stored DC electric power originating in the high-voltage battery 25 to AC electric power to drive the electric machine 35 to generate torque. Similarly, the inverter 32 converts mechanical power transferred to the electric machine 35 to DC electric power to generate electric energy that is storable in the high-voltage battery 25 as part of a regenerative control strategy. It is appreciated that the inverter 32 is configured to receive motor control commands and control inverter states to provide the motor drive and regeneration functionality.

An auxiliary power module (APM) 34 electrically connects to the high-voltage energy storage system 25 via the high-voltage DC power bus 29. The APM 34 includes a DC/DC electric power converter that electrically connects to the low-voltage battery 27 via a low-voltage DC power bus 28. The low-voltage battery 27 is preferably a low-voltage energy storage device, such as a nominal 12V DC battery, and is suitable for providing low-voltage electric power to the starter motor 39 and a low-voltage auxiliary system 45 onboard the vehicle. The low-voltage auxiliary system 45 connects to accessory components and systems that operate using low-voltage electric power supplied in a circuit that includes the low-voltage battery 27. Exemplary accessory components and systems include, e.g., headlamps and interior lights 46, a radio or audio system 48, power seats 50, and electric windows and HVAC components 52. The APM 34 may be configured as a DC-DC power converter that converts DC electric power from a high-voltage level to a low-voltage level, and vice versa. The operation of the APM 34 is controlled by the control module 12, which generates control signals to control power output thereof, including controlling either or both low-voltage current and voltage. As such, the APM 34 converts power at high voltage originating in the high-voltage energy storage system 25 to low voltage power suitable for charging the low-voltage battery 27 and/or powering one or more of the systems connected to the low-voltage auxiliary system 45 as needed. The control module 12 controls electric power flow aboard the vehicle from the high-voltage energy storage system 25 and low-voltage battery 27 to provide required electrical functionality.

The transmission 50 preferably includes one or more differential gear sets and activatable clutches configured to effect torque transfer in one of a plurality of fixed-gear operating modes over a range of speed ratios between the engine 40 and the output member 62. The transmission 50 includes any suitable configuration, and is preferably configured as an automatic transmission to automatically shift between the fixed-gear operating modes to operate at a gear ratio that achieves a preferred match between an operator torque request and an engine operating point. The transmission 50 automatically executes upshifts to shift to an operating mode having a lower numerical multiplication ratio (gear ratio) and executes downshifts to shift to an operating mode having a higher numerical multiplication ratio. A transmission upshift requires a reduction in engine speed so the engine speed matches transmission output speed multiplied by the gear ratio at a gear ratio associated with the target operating mode. A transmission downshift requires an increase in engine speed so the engine speed matches transmission output speed multiplied by the gear ratio at a gear ratio associated with the target operating mode. An inaccurate matching of engine speed and torque with transmission speed and torque may result in a sag in vehicle speed or torque output or clutch slippage upon execution of a transmission shift event.

The driveline 60 may include a differential gear device 65 that mechanically couples to an axle 64 or half-shaft that mechanically couples to a wheel 66 in one embodiment. The driveline 60 transfers tractive power between the transmission 50 and a road surface. It is appreciated that the powertrain system 20 is illustrative.

The control system 10 includes a control module 12 that is signally connected to an operator interface 14. The control module 12 preferably signally and operatively connects to individual elements of the powertrain system 20 either directly or via a communications bus 18. The control module 12 signally connects to the sensing devices of each of the high-voltage battery 25, the inverter module 32, the electric machine 35, the engine 40, and the transmission 50 to monitor operation and determine parametric states thereof The operator interface 14 of the vehicle 100 includes a plurality of human/machine interface devices through which the vehicle operator commands operation of the vehicle 100, including, e.g., an ignition switch to enable an operator to crank and start the engine 40, an accelerator pedal, a brake pedal, a transmission range selector (PRNDL), a steering wheel, and a headlamp switch. One vehicle operator command of interest is the operator torque request, which may be determined via operator inputs to the accelerator pedal and the brake pedal.

The powertrain system 20 includes a communications scheme including the communications bus 18 to effect communications in the form of sensor signals and actuator command signals between the control system 10 and elements of the powertrain system 20. It is appreciated that the communications scheme effects information transfer to and from the control system 10 using one or more communications systems and devices, including, e.g., the communications bus 18, a direct connection, a local area network bus, a serial peripheral interface bus, and wireless communications.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other suitable components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The powertrain system 20 is configured to operate in one of a plurality of operating modes, including a low-voltage electric power generating mode. The powertrain system 20 may operate in the low-voltage electric power generating mode when there is a fault in the high-voltage system causing the high-voltage DC bus 29 to be disconnected from the high-voltage battery 25, or in response to other conditions. When operating in the low-voltage electric power generating mode, the electric machine 35 generates electric power that is converted to low-voltage electric power in the APM 34 that may be supplied to power components and systems connected to the low-voltage auxiliary system 45. This may include operating conditions wherein the engine 40 is operating at low load conditions such as idle. As used herein, low load condition means a load below a predetermined load.

The engine 40 may be subject to stalling when operating at low load conditions or idle if a load condition changes at a rate at which the engine 40 is incapable of responding. This includes operating in the low-voltage electric power generating mode with the electric machine 35 using engine torque to generate electric power that is converted to low-voltage electric power by the APM 34 to power the components and systems connected to the low-voltage auxiliary system 45 in response to one or more accessory loads. Magnitude of the accessory load ($P_{acc}$) is associated with and corresponds to electric power demand of the components and systems connected to the low-voltage auxiliary system 45.

An engine stall threshold rate during engine operation at idle or at a low load condition may be determined Engine power may be indicated by crankshaft acceleration. One equation that governs crankshaft acceleration may be expressed as follows, ignoring spin losses outside of the engine and with an unlocked torque converter as set forth in EQ. 1 below:

$$J_{cs}\dot{N}_E = T_E + 2.4 T_A + T_{TrqCnvrtr,pump} \quad [1]$$

wherein $T_{TrqCnvrtr,pump}$ is the torque applied to the crankshaft by the torque converter,
$T_E$ is engine torque,
$N_E$ is engine speed,
$\dot{N}_E$ is engine acceleration,
$J_{CS}$ is crankshaft power, and
$T_A$ is motor torque output from the electric machine 35.

When operating in the low-voltage electric power generating mode with battery power at zero (Pbat=0), the accessory load $P_{acc}$ is equal to a power output of the electric machine 35 plus electrical power loss $P_{loss}$ as set forth in EQ. 2 below:

$$P_{acc} = N_A * T_A + P_{loss} \quad [2]$$

wherein the power output of the electric machine 35 is determined as the motor torque output $T_A$ from the electric machine 35 multiplied by speed $N_A$ of the electric machine torque. The electrical power loss $P_{loss}$ is preferably ignored. The power output of the electric machine 35, i.e., the accessory load $P_{acc}$ of the low-voltage auxiliary system 45 may be thus approximated as mechanical power using EQS. 1 and 2, as set forth in EQ. 3 below.

$$P_{acc} = N_A * T_A = -2.4 * N_E * T_A \quad [3]$$

EQ. 3 may be substituted into EQ. 1 and the torque applied to the crankshaft by the torque converter $T_{TrqCnvrtr,pump}$ may be ignored. As is appreciated, ignoring torque applied to the crankshaft by the torque converter $T_{TrqCnvrtr,pump}$ yields a result that is more conservative than may be needed, because as engine speed $N_E$ decreases, the load applied by the torque converter to the crankshaft also decreases. The resulting equation from substituting EQ. 3 into EQ.1 is as set forth in EQ. 4 below.

$$J_{CS}\dot{N}_E = T_E - \frac{P_{acc}}{N_E} \quad [4]$$

The analysis includes assuming the engine 40 is operating at MBT-spark, with the engine having no spark reserve and otherwise unable to increase its torque using a fast actuator.

Engine physics constrain engine operation to a maximum value of a time-rate change in engine torque $$\frac{dT_E}{dt},$$

which is referred to herein as $\dot{T}_{E,max}$. A command to increase engine torque at a rate greater than $\dot{T}_{E,max}$ to counteract any increases in the accessory load $P_{acc}$ may cause the engine 40 to stall.

EQ. 4 may be differentiated to achieve an expression involving a time-rate change in engine torque $\dot{T}_E$ as set forth in EQ. 5 below:

$$J_{CS}\ddot{N}_E = \dot{T}_E - \frac{N_E \dot{P}_{acc} - P_{acc}\dot{N}_E}{N_E^2} \quad [5]$$

wherein $\dot{P}_{acc}$ is a time-rate of change in the accessory load $P_{acc}$.

It is preferred that there is no time-rate change in the engine acceleration in EQ. 5, i.e., $\ddot{N}_E=0$. The result of this is as set forth in EQ. 6 below.

$$\frac{N_E \dot{P}_{acc} - P_{acc}\dot{N}_E}{N_E^2} \leq \dot{T}_{E,max} \quad [6]$$

It is appreciated that both accessory load $P_{acc}$ and engine speed $N_E$ may change. The accessory load $P_{acc}$ is readily controllable by controlling load demand of one or more of the accessory components and systems connected to the low-voltage auxiliary system 45. A constraint on a maximum increase rate in the accessory load $P_{acc}$ may be determined as set forth in EQ. 7 below:

$$\dot{P}_{acc} \le N_E \dot{T}_{E,max} + \frac{P_{acc}}{N_E} \dot{N}_E \quad [7]$$

EQ. 7 may be used to calculate a time-rate change in the engine power that is required to prevent occurrence of an engine stall, referred to herein as an engine stall threshold rate. The rate of increase in the accessory load $P_{acc}$, i.e., $\dot{P}_{acc}$ may be controlled using the engine stall threshold rate. The engine stall threshold rate determined using EQ. 7 includes the first term $N_E \dot{T}_{E,max}$ and the second term $$\frac{P_{acc}}{N_E} \dot{N}_E.$$

The first term $N_E \dot{T}_{E,max}$ indicates that the engine can prevent stalls that may be caused by an increase in the accessory load by increasing its own torque. The second term $$\frac{P_{acc}}{N_E} \dot{N}_E$$

indicates that the accessory load may be increased without causing engine stall when the engine speed is accelerating, even if $\dot{T}_{E,max}$ is zero.

Figure 2:
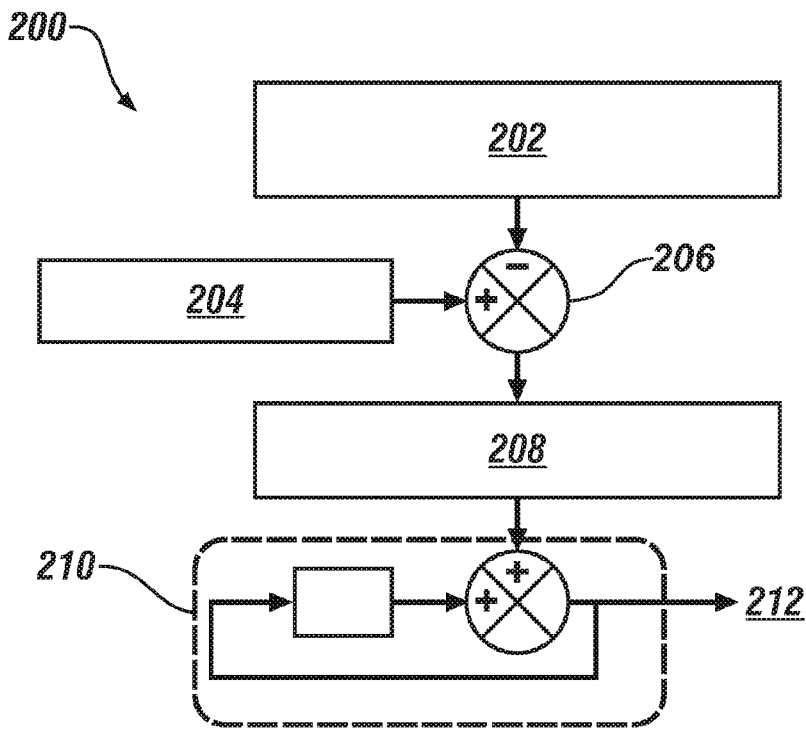
FIG. 2 illustrates a control scheme in the form of a flowchart for operating a powertrain system including an electric machine mechanically coupled to an internal combustion engine that mechanically couples to a transmission in accordance with the disclosure.

FIG. 2 is a control scheme 200 in the form of a flowchart for operating a powertrain system including an electric machine mechanically coupled to an internal combustion engine that mechanically couples to a transmission, e.g., the powertrain system 20 described with reference to FIG. 1. Overall, the control scheme 200 includes determining an engine stall threshold rate during engine operation in a low load condition. A time-rate change in the accessory load supplied by the electric machine operating in an electric power generating mode is controlled in response to the engine stall threshold rate during engine operation in the low load condition. The accessory load corresponds to accessory load demanded by the accessory components and systems connected to the low-voltage auxiliary system 45. Operating the electric machine 35 in the electric power generating mode in response to the engine stall threshold rate includes imposing a maximum time-rate change in the engine power, and controlling a time-rate change in the accessory load demanded by the low-voltage auxiliary system 45 therewith.

Table 1 is provided as a key wherein the numerically labeled blocks and the corresponding functions are set forth as follows, corresponding to the control scheme 200 of FIG. 2.

TABLE 1

| BLOCK | BLOCK CONTENTS |
|---|---|
| 202 | Calculate an engine stall threshold rate: $N_E \dot{T}_{E,max} + \frac{P_{acc}}{N_E} \dot{N}_E$ |
| 204 | Determine a time-rate change in accessory load |
| 206 | Calculate an excess accessory load rate as difference between the time-rate change in accessory load and the engine stall threshold rate |
| 208 | Determine a change in accessory load rate in response to the excess accessory load rate |
| 210 | Integrate the change in accessory load rate |
| 212 | Execute change in APM power in response to integration of change in accessory load rate |

During ongoing powertrain operation, an engine stall threshold rate is calculated, preferably using an embodiment of EQ. 7 that has been reduced to executable code (202). Operation of the powertrain system 20 includes operating at a low-voltage electric power generating mode wherein the electric machine 35 operates in an electric power generating mode with generated electric power converted to low-voltage electric power that is supplied in response to accessory load demanded by the accessory components and systems connected to the low-voltage auxiliary system 45. This may include operating conditions whereat the engine 40 is operating at idle.

Accessory loads are regularly and periodically monitored and a time-rate change in the accessory load calculated or otherwise determined of the powertrain system (204). An excess accessory load rate is determined, and is a difference between the engine stall threshold rate and the time-rate change in the accessory load (206). A change in the accessory load rate is determined in response to the excess accessory load rate (208). The change in accessory load rate is integrated over time using suitable integration methods (210).

A change in electric power output from the APM 34 is executed in response to the time-rate integration of the change in the accessory load rate (212). This operation has no effect upon electric power output from the APM 34 when the time-rate change in the accessory load is less than the engine stall threshold rate. This operation includes limiting the electric power output from the APM 34 to one or more of the accessory components and systems connected to the low-voltage auxiliary system 45 when the time-rate change in the accessory load exceeds the engine stall threshold rate. The electric power output from the APM 34 is controlled to be less than the engine stall threshold rate during engine operation in the low load condition when the electric machine 35 is operating in the electric power generating mode. This operation includes subsequently increasing the previously limited electric power output from the APM 34 when the time-rate change in the accessory load is subsequently less than the engine stall threshold rate. The magnitude of the limitation of the electric power output from the APM 34 corresponds to the magnitude of the difference between the time-rate change in the accessory load and the engine stall threshold rate.

Figure 3:
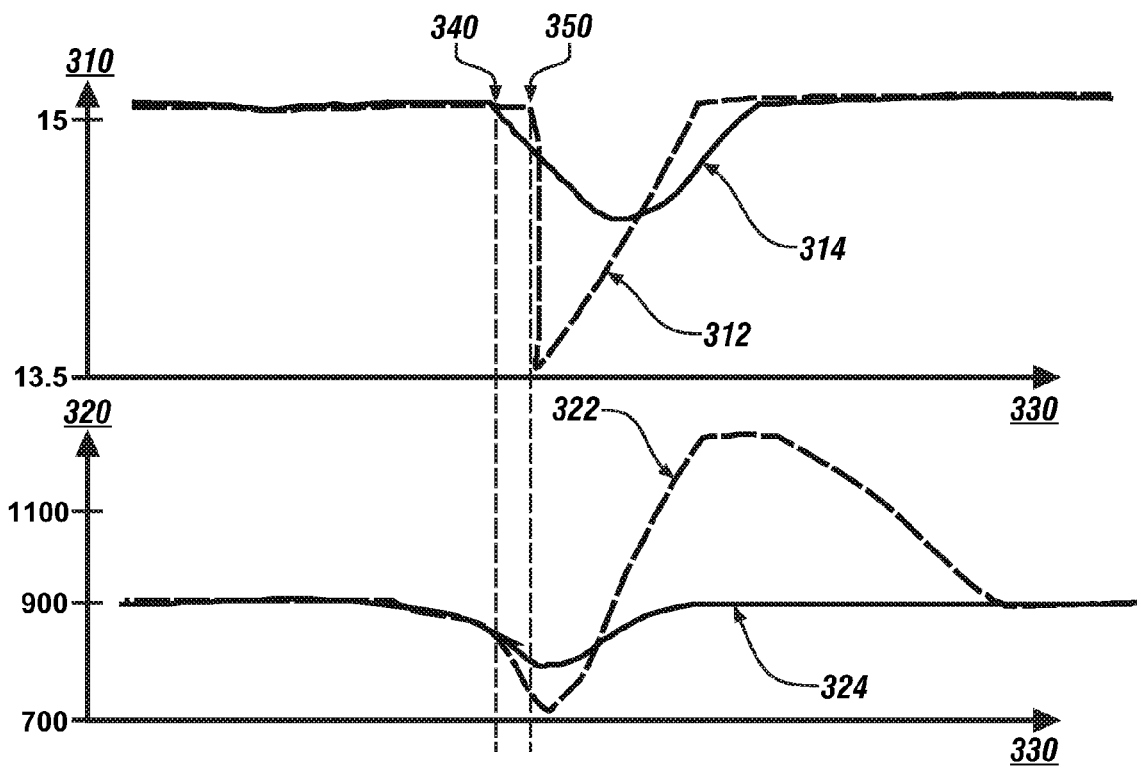
FIG. 3 illustrates electric power output from an auxiliary power module including an auxiliary power module voltage and corresponding engine speed associated with operation of an embodiment of the powertrain system and control scheme described with reference to FIGS. 2 and 3 in accordance with the disclosure.

FIG. 3 graphically includes coincident voltage (310) and engine speed (320) shown on y-axes plotted over elapsed time (330) shown on the x-axis.

The data includes electric power output from an APM control voltage 314 and corresponding engine speed 324 associated with operation of an embodiment of the powertrain system 20 shown with reference to FIG. 1 configured to execute an embodiment of the control scheme 200 shown with reference to FIG. 2. The data further includes electric power output from a known prior-art system, including a magnitude of an auxiliary control voltage 312 and a corresponding engine speed 322 that are associated with an embodiment of an analogous powertrain system operating without benefit of the control scheme 200.

Initially, the engine is operating at a nominal engine-idle speed around 900 rpm, and both the auxiliary control voltage 312 and the APM control voltage 314 are at nominal setpoints of about 15V.

Operating the powertrain system 20 shown with reference to FIG. 1 and executing an embodiment of the control scheme 200 shown with reference to FIG. 2 includes engine operation that includes maintaining the APM control voltage 314 at a fixed level, e.g., 15V while engine speed 322 drops in response to an increasing accessory load. At time point T2 340, an engine stall threshold rate is violated, and the APM control voltage 314 is reduced in corresponding magnitude. The engine speed 324 correspondingly increases due to the decreased accessory load, with the engine speed 324 returns to the nominal engine-idle speed in a controlled matter. Simultaneously the APM control voltage 314 increases in response to integration of change in accessory load rate.

Operating the known prior-art system includes engine operation that includes maintaining the auxiliary control voltage 312 at a fixed level, e.g., 15V while engine speed 322 drops in response to an increasing accessory load. At time point T1 350, an engine speed threshold associated with engine stall is violated, and the auxiliary control voltage 312 is reduced in a step response. The engine speed 322 correspondingly increases due to the decreased accessory load, with the engine speed 322 overshooting the nominal engine-idle speed before subsequently settling to the nominal engine-idle speed.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating a powertrain system including an electric machine mechanically coupled to an internal combustion engine mechanically coupled to a transmission, comprising:
   determining an engine stall threshold rate during engine operation in an idle load condition; and
   controlling a time-rate change in an accessory load supplied by the electric machine operating in an electric power generating mode in response to the engine stall threshold rate during engine operation in the low load condition;
   wherein determining the engine stall threshold rate during engine operation in the idle load condition comprises calculating the engine stall threshold rate in accordance with:

$$N_E \dot{T}_{E,max} + \frac{P_{acc}}{N_E} \dot{N}_E$$

wherein
   $N_E$ indicates engine speed,
   $\dot{N}_E$ indicates engine acceleration,
   $\dot{T}_{E,max}$ indicates a maximum value of a time-rate change in engine torque, and
   $P_{acc}$ indicates accessory power.

2. The method of claim 1, wherein determining the engine stall threshold rate during engine operation in the idle load condition comprises determining a time-rate change in engine power during engine operation in the idle load condition corresponding to an engine stall condition.

3. The method of claim 1, wherein controlling the time-rate change in accessory load supplied by the electric machine operating in the electric power generating mode comprises controlling electric power available to low-voltage auxiliary systems.

4. The method of claim 1, wherein controlling the time-rate change in accessory load supplied by the electric machine operating in the electric power generating mode in response to the engine stall threshold rate during engine operation in the idle load condition comprises limiting the accessory load when the time-rate change in the accessory load exceeds the engine stall threshold rate.

5. Method for controlling a time-rate change in torque output of an electrically powered torque machine in a powertrain system including the torque machine mechanically coupled to an internal combustion engine mechanically coupled to a transmission, comprising:
   determining an engine stall threshold rate during engine operation at idle when operating the torque machine in a low-voltage electric power generating mode; and
   controlling a time-rate change in an accessory load supplied by the torque machine operating in the electric power generating mode to be less than the engine stall threshold rate;
   wherein determining the engine stall threshold rate during engine operation at idle when operating the torque machine in the low-voltage electric power generating mode comprises calculating the engine stall threshold rate in accordance with:

$$N_E \dot{T}_{E,max} + \frac{P_{acc}}{N_E} \dot{N}_E$$

wherein:
   $N_E$ indicates engine speed,
   $\dot{N}_E$ indicates engine acceleration,
   $\dot{T}_{E,max}$ indicates a maximum value of a time-rate change in engine torque, and
   $P_{acc}$ indicates accessory power.

6. The method of claim 5, wherein determining the engine stall threshold rate during engine operation at idle when operating the torque machine in the low-voltage electric power generating mode comprises determining a time-rate change in engine power during engine operation at idle corresponding to an engine stall condition.

7. The method of claim 5, wherein controlling the time-rate change in the accessory load supplied by the torque machine operating in the low-voltage electric power generating mode to be less than the engine stall threshold rate comprises limiting the accessory load when the time-rate change in the accessory load exceeds the engine stall threshold rate.

8. Method for operating a powertrain system including an electric machine mechanically coupled to an internal combustion engine mechanically coupled to a transmission, the electric machine configured to generate electric power for a low-voltage accessory system, comprising:
   determining an engine stall threshold rate during engine operation in an idle load condition when operating the electric machine in an electric power generating mode; and controlling an electric load of the low-voltage accessory system to a time-rate change that is less than the engine stall threshold rate; wherein determining the engine stall threshold rate during engine operation in the idle load condition when operating the electric machine in the electric power generating mode comprises calculating the engine stall threshold rate in accordance with:

$$N_E \dot{T}_{E,max} + \frac{P_{acc}}{N_E} \dot{N}_E$$

wherein
  $N_E$ indicates engine speed,
  $\dot{N}_E$ indicates engine acceleration,
  $\dot{T}_{E,max}$ indicates a maximum value of a time-rate change in engine torque, and
  $P_{acc}$ indicates accessory power.

9. The method of claim 8, wherein controlling the electric load of the low-voltage accessory system to a time-rate change that is less than the engine stall threshold rate comprises controlling a time-rate change in a voltage setpoint of an auxiliary power module configured to convert electric power output from the electric machine to low-voltage electric power.

10. The method of claim 8, wherein controlling electric load of the low-voltage accessory system to the time-rate change that is less than the engine stall threshold rate comprises controlling electric power available to the low-voltage accessory system at a rate that is less than the engine stall threshold rate.

* * * * *